United States Patent [19]

Grenier

[11] Patent Number: 4,882,121

[45] Date of Patent: Nov. 21, 1989

[54] APPARATUS FOR THE DETECTION OF E. G. EXPLOSIVE SUBSTANCES

[75] Inventor: Gërard Grenier, Limeil-Brevannes, France

[73] Assignee: Commisseriat a l'Energie Atomique, Paris, France

[21] Appl. No.: 175,629

[22] Filed: Mar. 31, 1988

Related U.S. Application Data

[62] Division of Ser. No. 917,683, Oct. 10, 1986, abandoned.

[30] Foreign Application Priority Data

Oct. 18, 1985 [FR] France .................................. 8515474

[51] Int. Cl.$^4$ ........................... G21G 1/06; G21H 5/00
[52] U.S. Cl. .................................................... 376/159
[58] Field of Search ................. 376/159, 157, 161, 166

[56] References Cited

U.S. PATENT DOCUMENTS

| | | | |
|---|---|---|---|
| 2,938,119 | 5/1960 | McKay | 250/390 C |
| 3,124,679 | 3/1964 | Tittman et al. | 250/390 C |
| 3,146,349 | 8/1964 | Jordan . | |
| 3,315,077 | 4/1967 | Jones, Jr. et al. | 250/390 C |
| 3,463,922 | 8/1969 | Senftle et al. | 250/363 |
| 3,748,472 | 7/1973 | Smith . | |
| 3,801,816 | 4/1974 | Arnold | 376/166 |
| 3,812,364 | 5/1974 | Higatsberger et al. | 250/390 C |
| 3,832,545 | 8/1974 | Bartko | 250/367 |
| 3,942,003 | 3/1976 | Apenberg et al. | 250/390 C |
| 3,997,787 | 12/1976 | Fearon et al. | 250/359.1 |
| 4,008,392 | 2/1977 | Lock et al. | 376/161 |
| 4,024,393 | 5/1977 | Braun et al. | 250/390 C |
| 4,209,695 | 6/1980 | Arnold et al. | 376/161 |
| 4,263,098 | 4/1981 | Kasperek et al. | 376/159 |
| 4,268,754 | 5/1981 | Srapeniants et al. | 250/390 C |
| 4,278,885 | 7/1981 | Alfthan et al. | 250/390 C |
| 4,291,227 | 9/1981 | Caldwell et al. | 250/390 C |
| 4,314,155 | 2/1982 | Sowerby | 250/390 C |

FOREIGN PATENT DOCUMENTS 2201765 4/1974 France .

OTHER PUBLICATIONS

J. of Radioanalytical and Nuclear Chemistry, Articles, vol. 84, (1984), pp. 67–87, Nadkarni.
*Modern Methods for Trace Element Analysis*, (Ann Arbor Science Pub. Inc., 1978), Chap. 9, pp. 352–355, 358–359, 370–379, 390–395, by Pinta.

Primary Examiner—Harvey E. Behrend
Attorney, Agent, or Firm—Oblon, Spivak, McClelland, Maier & Neustadt

[57] ABSTRACT

It comprises e.g. a 14 MeV neutron generator for supplying these neutrons to an object liable to contain an explosive, a germanium detector and analysis means coupled to the detector and able to analyse the fast $\gamma$ photons emitted by the object and trapped by the detector and determine the nitrogen/oxygen ratio in the object, so that this ratio can be compared with that of the explosive and establish whether the object contains said explosive.

7 Claims, 1 Drawing Sheet

U.S. Patent
Nov. 21, 1989
4,882,121
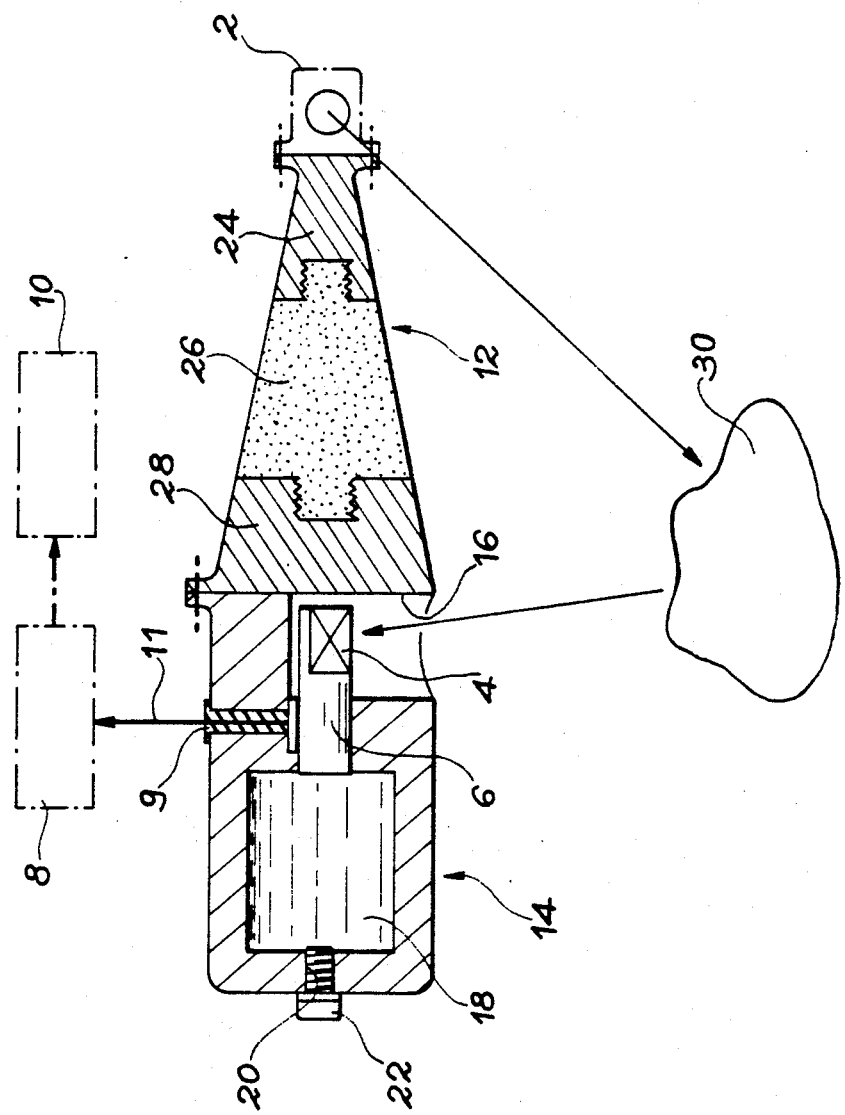

APPARATUS FOR THE DETECTION OF E. G. EXPLOSIVE SUBSTANCES

This application is a division of application Ser. No. 06/917,683, filed on Oct. 10, 1986, now abandoned.

BACKGROUND OF THE INVENTION

The present invention relates to an apparatus for the detection of substances and in particular explosive. It permits a non-destructive inspection of objects, such as parcels suspected of containing an explosive, by e.g. measuring the N/O ratio of said objects, said ratio providing a good signature of most explosives.

Bearing in mind the object liable to contain a substance such an explosive, it is necessary to be able to install the detection apparatus close to the object to establish whether or not it contains the substance in question.

SUMMARY OF THE INVENTION

The object of the present invention is to solve this problem.

Therefore the present invention specifically relates to an apparatus for the detection of a substance which may be contained in an object, wherein it comprises means for producing neutrons, whose energy is between approximately 7 and 14 MeV, said means serving to supply the object with neutrons, a detector which can be placed in the vicinity of the object, said detector being sensitive to the $\gamma$ photons emitted by at least one chemical element contained in the substance under the impact of the neutrons and which can supply a signal representing said $\gamma$ photons, whereby said detector is protected from the radiation directly emitted by the neutron production means and radiation induced in the environment of the apparatus by said production means and electronic analysis means able to analyse the particular signal, corresponding to the prompt $\gamma$ photons emitted by the object under the impact of the neutrons and able to supply information permitting the identification of the element.

In the case of an element contained in the substance, it can then be considered that the object may well contain said substance and other investigations can be carried out to confirm what is contained therein.

The energy of the neutrons is made at least equal to approximately 7 MeV, so that it is possible to produce prompt $\gamma$ photons on a light element, such as oxygen, whose first excited level is at 6.130 MeV and on nitrogen, whose most important excited level is at 5.106 MeV.

The energy of the neutrons could be chosen beyond 14 MeV, but the corresponding neutron production means are difficult to transport.

Unlike in the case of systems, mainly used for geological prospecting and which are based on the detection of capture $\gamma$ photons emitted by nucleii following the capture of incident neutrons slowed down by the analyzed medium, the apparatus according to the invention is based on the detection of prompt $\gamma$ radiation, emitted by the object and substantially coinciding with the incident neutrons from their production means and more particularly corresponding to inelastic scattering of these neutrons or to nuclear reactions of the n, p $\gamma$ type, which makes it possible to position the apparatus according to the invention in the vicinity of the object liable to contain the substance for the purpose of inspecting said object.

The use within the context of the present invention of fast neutrons with an energy between approximately 7 and 14 MeV, thereby obviating the use of a moderator, makes it possible to have access to characteristic excited levels of certain elements, which are inaccessible to other methods, such as those which use thermal neutrons (which also do not make it possible to produce prompt gamma photons).

Preferably, the detector is sensitive to $\gamma$ photons emitted by at least two chemical elements contained in the substance and the electronic means are also able to supply information making it possible to determine the relative atomic percentage of these elements in the object on the basis of the particular signal.

Thus, it is possible to compare this percentage with that corresponding to the substance to establish whether the object contains said substance.

In a preferred manner, the energy of the neutrons is approximately 14 MeV. Thus, a neutron source of approximately 14 MeV is easy to use and transport.

In a preferred embodiment of the apparatus according to the invention, the neutron production means comprise a pulsed neutron generator. A continuous generator could be used but the signal-to-noise ratio is better in a pulsed generator.

In a special embodiment of the apparatus according to the invention, the detector is a germanium detector. Preferably, the germanium is intrinsic. Thus, contrary to a doped, e.g. lithium doped germanium detector, which deteriorates if it is not kept at a temperature at the most equal to the temperature of liquid nitrogen, an intrinsic germanium detector can be stored at ambient temperature when it is not in use.

According to another special embodiment and with the substance being an explosive, the detector is a preferably intrinsic germanium detector and electronic means are provided for supplying information making it possible to determine the relative atomic percentage of nitrogen and oxygen in the object on the basis of the particular signal.

Preferably, the detector is separated from the neutron production means by a shield, which protects said neutron detector and widens as from the production means, so as not to increase the ambient background radiation during the emission of neutrons by their production means.

The apparatus according to the invention also advantageously comprises means for cooling the detector, in order that the latter can operate as correctly as possible.

Finally, electronic means can also be able to analyse another signal, corresponding to capturing $\gamma$ photons liable to be emitted by the object under the impact of the neutrons.

DESCRIPTION OF THE DRAWING AND PREFERRED EMBODIMENTS

The invention is described in greater detail hereinafter relative to non-limitative embodiment and with reference to the single drawing diagrammatically showing a special embodiment of the apparatus according to the invention applied to the detection of an explosive.

The represented apparatus comprises a pulsed 14 MeV generator 2 of the type marketed e.g. by SODERN and able to emit neutron bursts, whose frequency and time width can be chosen, as well as a $\gamma$ spectrometry chain incorporating a germanium detector 4 for $\gamma$ photons, a preamplifier 6 coupled to the detector, an amplifier 8 connected to the preamplifier and a multi-channel analyser 10 connected to the amplifier.

The assembly formed by detector 4 and preamplifier 6 is placed in an enclosure for protecting said assembly against direct neutrons from generator 2 and the ambient radiation background induced by said neutrons. This enclosure has a part 12 which widens from the generator to said assembly and which e.g. has a frustum shape, and also another part 15, which is e.g. cylindrical, has the same axis as part 12 and is in contact with the large base of the latter by one end, whilst containing the detector and preamplifier, an opening 9 being provided in the other part 14 for the passage of an insulated electric cable 11 connecting the preamplifier to amplifier 8, which is located outside the enclosure. An elongated cavity 16 acting as a collimator is provided in said other part 14 perpendicular to the axis common to parts 12 and 14 and on one side issues on detector 4 and on the other outside the enclosure. The collimator e.g. has a circular or square cross-section and its dimensions, which define an angular aperature for the detector, are chosen as a function of the size of the objects which it is wished to examine with the apparatus according to the invention.

This apparatus also comprises means for cooling detector 4 and preamplifier 6, e.g. constituted by a reservoir 18 placed in the other part 14 in contact with the preamplifier. Reservoir 18 has a filling opening 20 passing through the other part 14 to issue outside the latter, e.g. opposite to said part 12 and which is closed by a plug 22. The reservoir can be designed so as to have an autonomy of e.g. 36 or 72 hours.

On passing from generator 2 to detector 4, the frustum-shaped part 12 can comprise a first tungsten member 24, a second boron-containing polyethylene member 26 and a third tungsten member 28, said three members being fixed to one another, whilst the third member 28 is also fixed to the other part 14, which can also be made from tungsten.

It is possible to produce an apparatus which has small overall dimensions and is dismantlable, which facilitates transportation. To this end, it is possible to provide dismantlable fastenings of the generator to member 24, of the latter to member 26 and of the latter to the other part 14, member 26 e.g. being axially screwed to the adjacent members 24, 28.

The apparatus according to the invention is used as follows. In the case of an object 30 to be inspected to establish whether it contains an explosive, the dismantled apparatus is brought into the vicinity of the object and it is installed in such a way that the object faces generator 2 and collimator 16. The generator and γ spectrometry chain are operated. The neutron bursts emitted by the generator interact with object 30, which therefore emits various γ photons and in particular prompt γ photons, which in turn interact with detector 4. The spectrometry chain is regulated for detecting γ photons emitted in quasi-coincidence with the neutron bursts, i.e., prompt γ photons.

The spectrum of the prompt γ photons obtained in this way by the spectrometry chain is then displayed on a not shown screen. The spectrum peaks are identified and, after calibration, the energy of these peaks and finally the elements present in the object. It is thus possible e.g. to determine the ratio of the area of the nitrogen peak to the area of the oxygen peak (if these peaks are present in the spectrum) and therefore the N/O ratio of the number of nitrogen atoms to the number of oxygen atoms. By comparing this ratio with N/O ratios of the different known explosives, it is possible to establish whether or not said object contains an explosive.

In fact, γ spectrometry chains able to directly display this N/O ratio are known. Many other elements can be identified by prompt γ.

It is also possible to acquire delayed γ photons or capture γ photons emitted between two successive neutrons bursts, which makes it possible to identify the chlorine element present in certain explosives and more generally elements producing a large amount of capture γ photons, when the object functions as a moderator.

It is possible to obtain access to the N/O ratio due to the fact that the main identification lines of nitrogen and oxygen have adjacent energies and therefore an identical auto-absorption. The apparatus according to the invention makes it possible to determine this N/O ratio relatively quickly and in a time of approximately 40 to 50 minutes.

The production of neutrons, whose energy is between approximately 7 and 14 MeV can be obtained by using a roughly 14 MeV neutron generator, associated with an appropriate known energy converter able to supply neutrons of an energy level between approximately 7 and 14 MeV.

What is claimed is:

1. A process for detecting an explosive which may be contained in an object, wherein it comprises irradiating the object by means of fast neutron pulses, said fast neutrons having an energy between 7 and 14 MeV, and detecting prompt gamma photons emitted in coincidence with said neutron pulses and having an energy of 5.106 MeV characterizing nitrogen, and prompt gamma photons emitted in coincidence with said neutron pulses and having an energy of 6.130 MeV characterizing oxygen, determining the relative atomic percentage of nitrogen and oxygen in the object by means of the detected 5.106 MeV and 6.130 MeV photons, and comparing said percentage to N/O ratios of known explosives.

2. A process according to claim 1, wherein said prompt gamma photons are detected by means of a gamma spectrometry chain incorporating a germanium detector.

3. A process according to claim 1, wherein said pulsed neutrons have an energy of 14 MeV.

4. A process according to claim 1, wherein said prompt gamma photons are detected by means of a gamma spectrometry chain incorporating an intrinsic germanium detector.

5. A process according to claim 1, wherein said pulsed neutrons are produced by a pulsed neutron generator and wherein said prompt gamma photons are detected by means of a gamma spectrometry chain incorporating a gamma photon detector which is separated from the neutron generator by a shield which protects the detector from the neutrons and widens away from the generator.

6. A process according to claim 1, wherein said prompt gamma photons are detected by means of a gamma spectrometry chain incorporating a gamma photon detector provided with means for cooling said detector.

7. A process according to claim 1, wherein it further comprises detecting capture gamma photons liable to be emitted by the object under the impact of the neutrons.

* * * * *

UNITED STATES PATENT AND TRADEMARK OFFICE
CERTIFICATE OF CORRECTION

PATENT NO. : 4,882,121

DATED : Nov. 21, 1989

INVENTOR(S) : Gérard Grenier

It is certified that error appears in the above-identified patent and that said Letters Patent is hereby corrected as shown below:

On the title page, item [73]:

The Assignee is incorrectly recorded, "Commisseriat" should be:
--Commissariat--

Signed and Sealed this

Eighth Day of January, 1991

Attest:

HARRY F. MANBECK, JR.

Attesting Officer

Commissioner of Patents and Trademarks